US007217309B2

(12) United States Patent
Colamussi

(10) Patent No.: US 7,217,309 B2
(45) Date of Patent: May 15, 2007

(54) MICROPOROUS PAPER FILTER FOR PARTICULATES

(76) Inventor: Arturo Colamussi, Via Borso 8 - I - 44100, Ferrara (IT)

( * ) Notice: Subject to any disclaimer, the term of this patent is extended or adjusted under 35 U.S.C. 154(b) by 78 days.

(21) Appl. No.: 10/842,096

(22) Filed: May 10, 2004

(65) Prior Publication Data
US 2004/0226274 A1 Nov. 18, 2004

(30) Foreign Application Priority Data
May 13, 2003 (IT) .................. MI2003 A 0960

(51) Int. Cl.
*B01D 46/52* (2006.01)
(52) U.S. Cl. .............. 55/521; 55/500; 55/501; 55/527; 422/180; 422/182; 422/310; 428/136; 428/181; 428/182; 502/527.22; 502/527.23
(58) Field of Classification Search ............ 55/500, 55/501, 521, 527; 422/180, 182, 310; 428/136, 428/181, 182; 502/527.22, 527.23
See application file for complete search history.

(56) References Cited
U.S. PATENT DOCUMENTS

| | | | | |
|---|---|---|---|---|
| 2,019,186 A | * | 10/1935 | Kaiser | 96/390 |
| 3,941,571 A | * | 3/1976 | Getzin | 55/500 |
| 4,725,411 A | * | 2/1988 | Cornelison | 422/180 |
| 4,942,020 A | * | 7/1990 | Whittenberger et al. | 422/180 |
| 5,562,825 A | * | 10/1996 | Yamada et al. | 210/321.74 |
| 5,792,244 A | * | 8/1998 | Morlec et al. | 96/135 |
| 5,908,480 A | * | 6/1999 | Ban et al. | 55/482 |
| 6,273,938 B1 | * | 8/2001 | Fanselow et al. | 95/90 |
| 6,280,824 B1 | * | 8/2001 | Insley et al. | 428/172 |
| 6,413,303 B2 | * | 7/2002 | Gelderland et al. | 96/135 |
| 6,524,488 B1 | * | 2/2003 | Insley et al. | 210/767 |
| 6,585,793 B2 | * | 7/2003 | Richerson et al. | 55/521 |
| 6,942,708 B2 | * | 9/2005 | Peter et al. | 55/282.3 |
| 2002/0083692 A1 | * | 7/2002 | Richerson et al. | 55/521 |

FOREIGN PATENT DOCUMENTS

| | | |
|---|---|---|
| EP | 0 457 018 | 11/1991 |
| JP | 05-115734 | 5/1993 |
| JP | 06-299840 | 10/1994 |

* cited by examiner

*Primary Examiner*—Minh-Chau T. Pham
(74) *Attorney, Agent, or Firm*—Hedman & Costigan; James V. Costigan

(57) ABSTRACT

A microporous paper filter (10) for particulates emitted together with the exhaust gases of internal combustion engines, made in the form of a folded up sheet to form a "Greek key" i.e. having several filtering layers (13) placed substantially parallel, connected by means of folds (14), the layers (13) being separated and maintained equidistant through the interposition of spacers (20) each comprising at least one corrugated paper sheet (21, 22) or pleated paper (23).

3 Claims, 5 Drawing Sheets

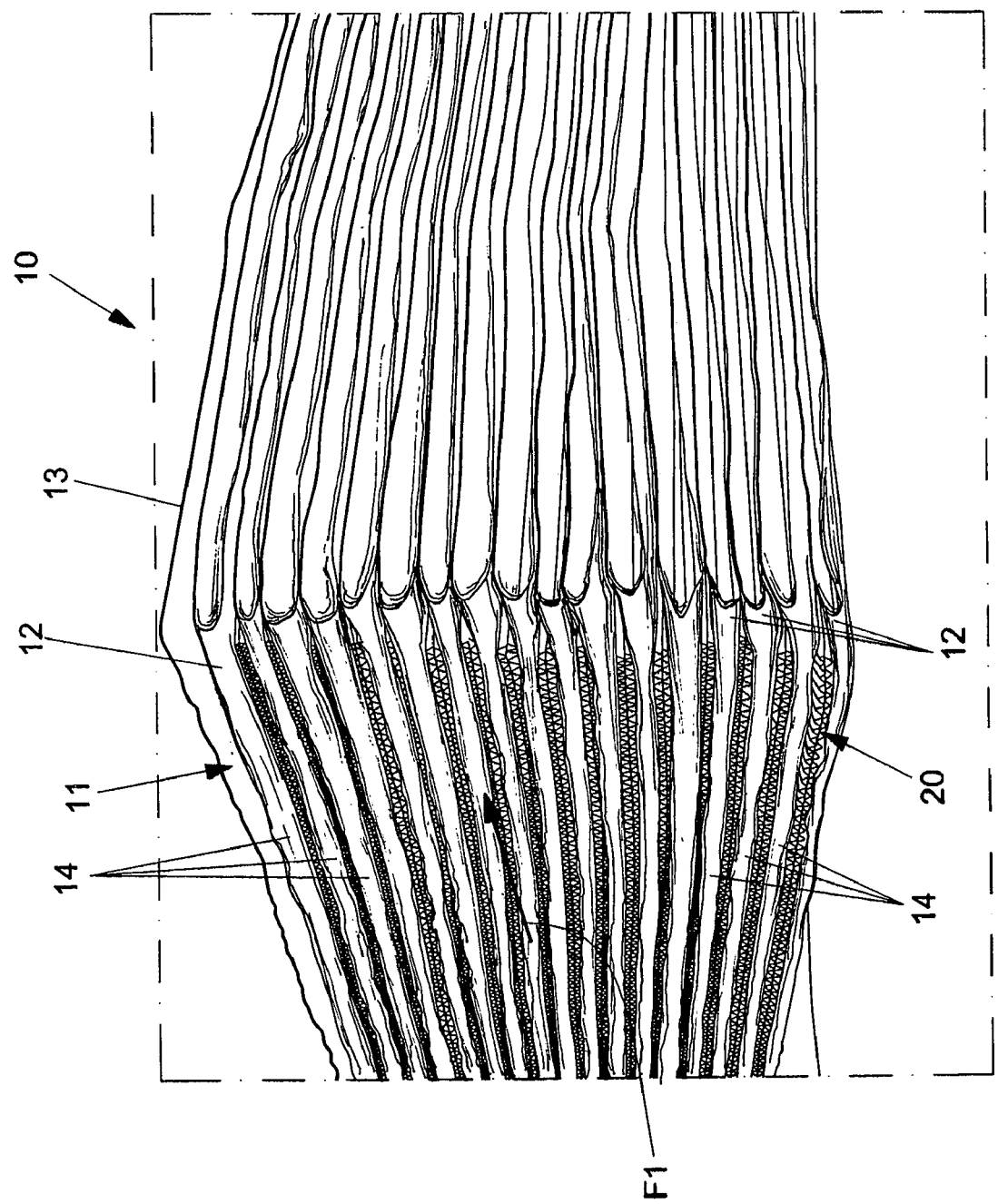

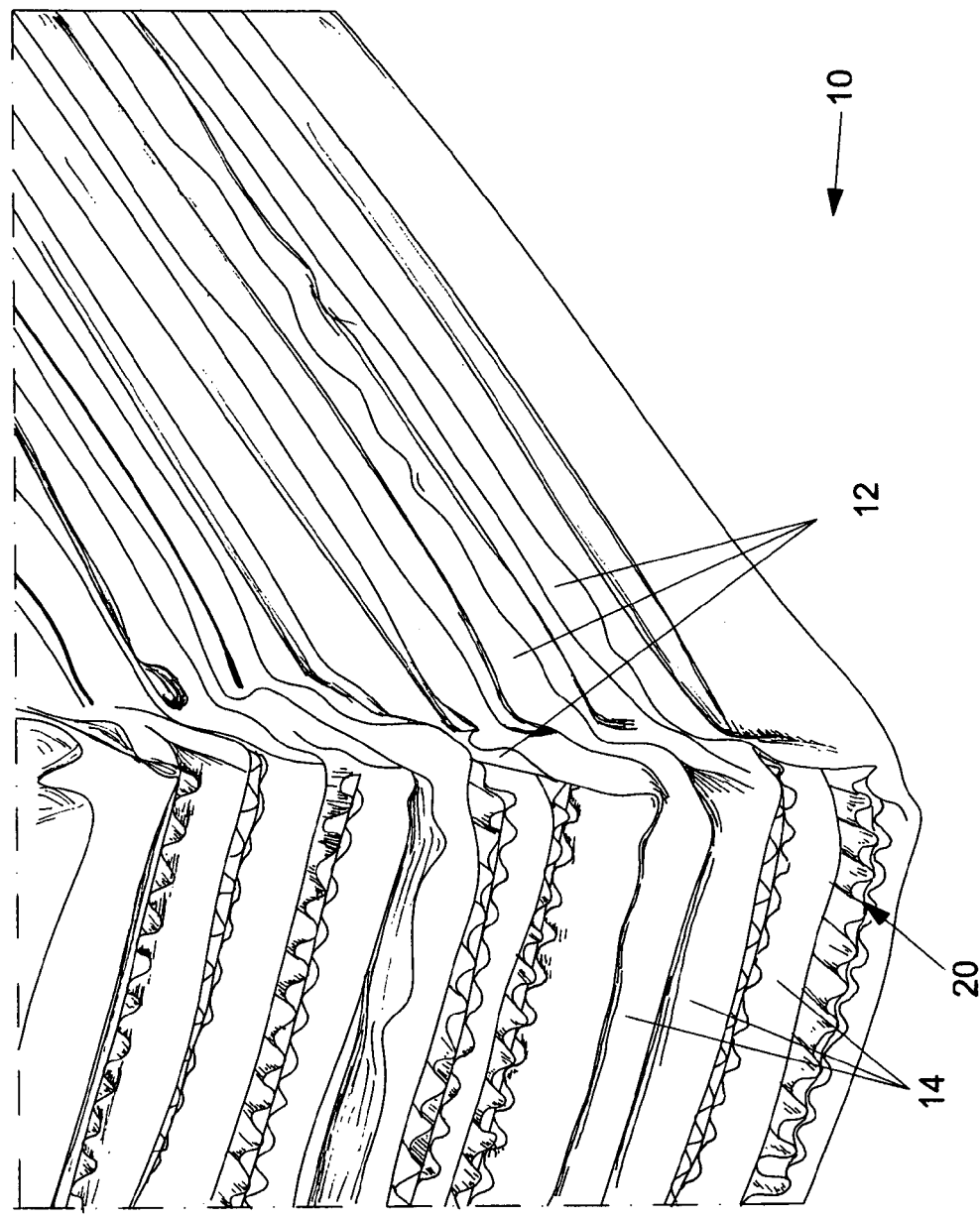

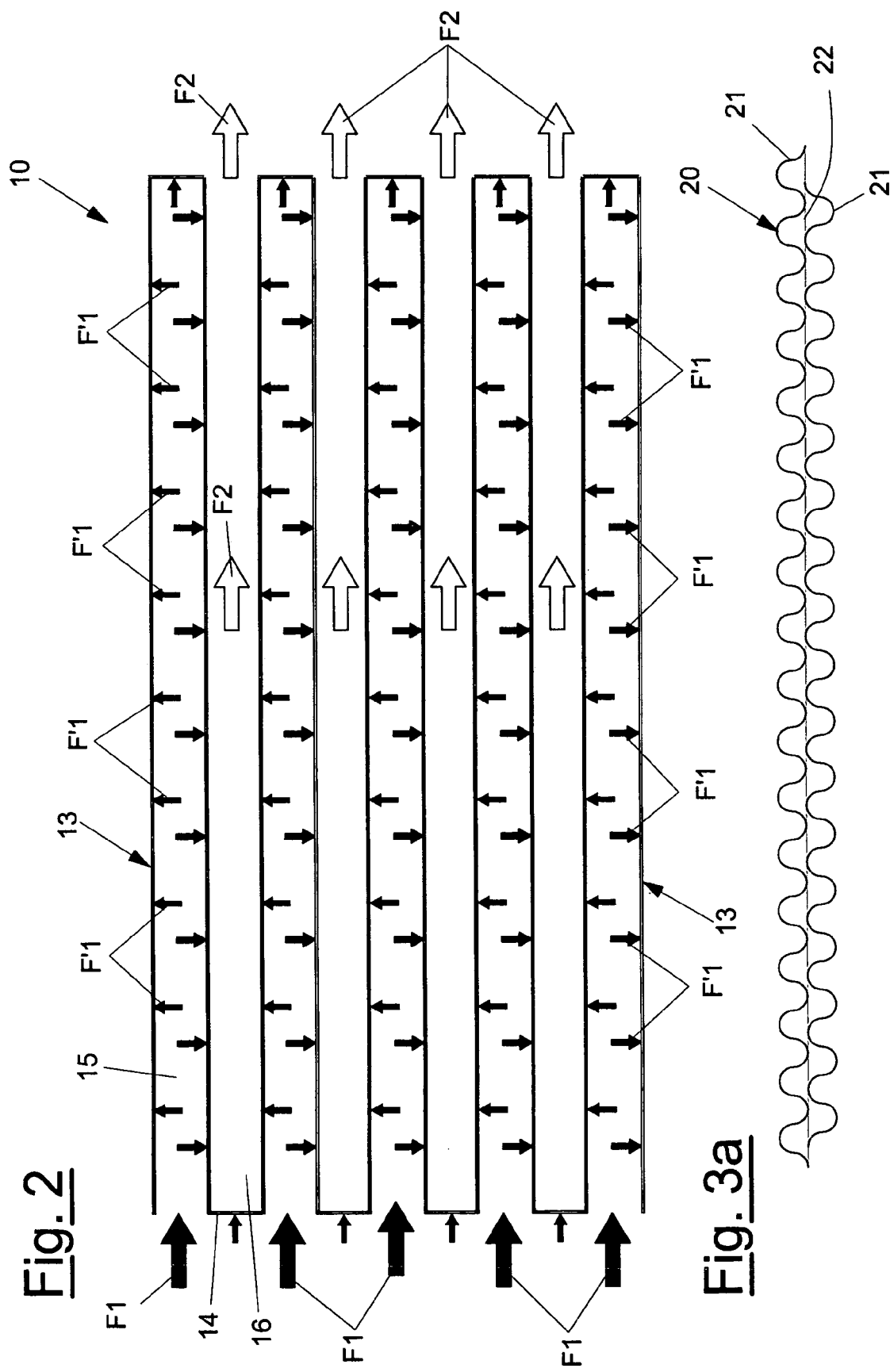

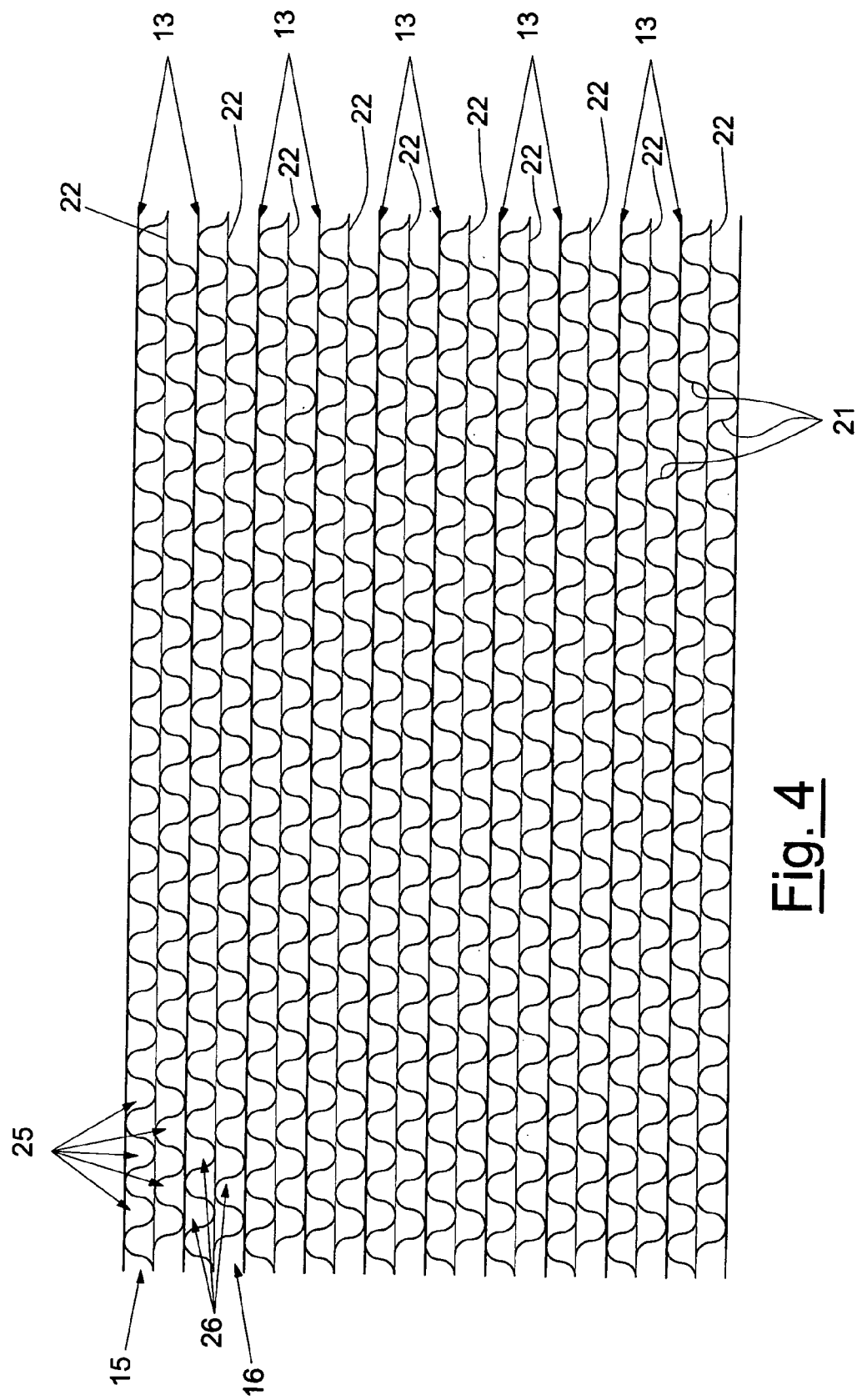

MICROPOROUS PAPER FILTER FOR PARTICULATES

CROSS-REFERENCE TO RELATED APPLCIATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION (1) Field of the Invention

The present invention concerns a microporous paper filter for particulates.

More in detail, the invention concerns a microporous paper filter for particulate, having large volume surface to filter the particulate released together with the exhaust gases of internal combustion engines, such as the Diesel cycle engines.

(2) Description of Related Art

The general problem of environmental pollution, produced not only by the internal combustion engines, in particular the Diesel cycle engines, but also through different sources, such as, for example, the burners of the heating systems, is mainly centered on the particulate comprising unburned carbon particles which, when of small particle size, normally smaller than 10 microns, represent a great danger for the health of the inhaling person.

The atmospheric conditions, the traffic increase in cities and the increase of the Diesel cycle engines, have greatly increased the problem, and drastic measures for the traffic limitation were adopted in urban areas.

Various solutions have been proposed to remedy a continuously worsening pollution situation, operating according to different principles.

Among the filtering systems proposed, there are those called self-regenerating, for example a filter is well known, consisting of a device comprising a section containing a catalyst which generates nitrogen dioxide ($NO_2$), followed by a section consisting of a ceramic filter capable of retaining the particulate.

When this filter reaches the temperature of 250° C., $NO_2$ triggers the combustion of the carbon particles trapped in the filter, thus preventing the progressive obstruction.

But the above-described device has some limitations:

gas oil must not contain sulfur, otherwise the catalyst is poisoned;

the device functioning is linked to the exhaust gas temperature;

the combustion ashes of the lubricating oil cannot be eliminated from the particulate filter, which, therefore, is progressively obstructed;

the $NO_2$ production can represent a danger for the environment;

it is not easy to verify the efficacy of the system during the running of time.

The non negligible realization and installation costs are to be added to the above drawbacks.

This solution did not have, for the above reasons, great success for the solution of the environmental pollution problem due to exhaust gases.

The general object of the present invention is, therefore, to produce a microporous paper filter for particulate, having high volume surface, which results fairly durable.

Another object of the present invention is to produce a microporous paper filter of particularly reduced dimensions, which can be housed into a container, of economical production and simple installation and substitution.

Another object of the present invention is to produce a filter consisting of a microporous paper suitably selected, capable of retaining the particulate emitted together with the discharge gases of internal combustion engines, particularly Diesel cycle engines, having dimensions lower than 10 microns.

Another object of the present invention is to produce a filter which allows not to disperse the particulate, separated from the exhaust gases, in the atmosphere.

A further object of the present invention is to produce a filter which does not present an appreciable pressure drop for the gases which go through it, therefore which does not cause significant counter-pressures in the exhaust.

These and other objects according to the present invention are achieved by a microporous paper filter for filtering particulates.

BRIEF SUMMARY OF THE INVENTION

The paper filter for particulate object of the present invention, in particular a paper filter for particulate emitted together with the exhaust gases of internal combustion engines, is produced as a folded up sheet in the form of a "Greek key" with several filtrating layers placed substantially parallel, connected by means of folds, the layers being separated and maintained equidistant through the interposition of spacers comprising at least one corrugated paper sheet or pleated paper.

BRIEF DESCRIPTION OF THE SEVERAL VIEWS OF THE DRAWINGS

The characteristics and advantages of a microporous paper filter for particulate according to the present invention, will appear more evident from the following description, illustrative but not limiting, referred to the enclosed schematic drawings, wherein:

FIGS. 1a and 1b are prospect views of the filter according to the invention;

FIG. 2 is a side schematic view of a particular of the filter according to the invention;

FIGS. 3a–3c are detail views of the filter according to the invention;

FIG. 4 is a schematic front view of the filter of FIG. 1a;

DETAILED DESCRIPTION OF THE INVENTION

Figure 3B:
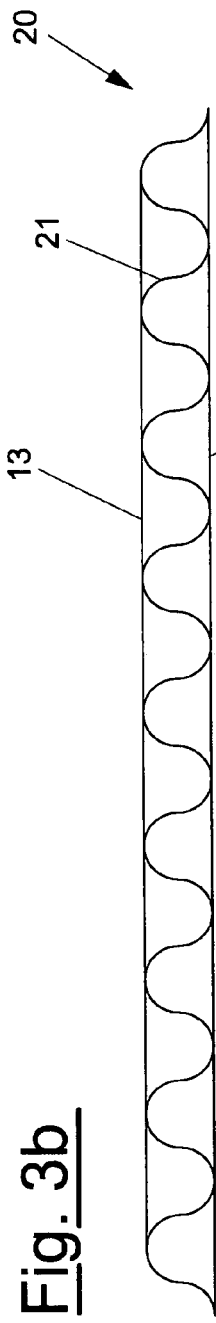

A paper filter 10, with reference to the figures, is illustrated, suitable to filter the particulate emitted together with the exhaust gases of internal combustion engines, in particular Diesel cycle engines.

Filter 10, according to the invention, comprises a filtering element 11 made of a suitable microporous paper folded in the form of a "Greek key", having several layers 13 placed substantially parallel, connected through folds 14 of the same filtering paper.

On the basis of researches and experimentations, the Applicant reached the conclusion that the microporous paper normally used for the air filters in the internal combustion engines, in a particular embodiment, represents a very efficient filtering system for the exhaust gases of the Diesel cycle engines.

Moreover, when papers with filtering efficiency higher than 99% for particles around 1 micron, and a specific area expressed as a suitable function of the engine power ($m^2$/Kw) are used, it can be noted that the filter can treat very high volumes of gas, before showing remarkable pressure drops.

This is due to the filtering power of the particulate collected on the paper, which, in turn, acts as a filter, preventing the finest particles to obstruct the paper micropores.

Contrary to a prejudice strongly accepted and amply mentioned in literature, the Applicant observed that microporous paper is available on the market, suitable to tolerate, without any problem, temperatures of about 150° C., temperature obtainable by cooling down, through simple means, the exhaust gas, when really necessary.

The layers 13 are separated by interposing a spacer 20 consisting of corrugated or pleated paper having a stiffness so as to prevent the collapse of the layers 13.

In this way, a large surface of filtering paper is available in a limited space, thus producing a filter having high volume surface.

With particular reference to FIG. 3b, this spacer 20 is made, for example, by means of corrugated board 21.

A corrugated paper 21 is preferably used, stuck along the generatrix to a supporting paper sheet or cover 22, available in normal production, in order to confer higher resistance and to allow to automate the production of the filter; this set is hereinafter referred to as "corrugated paper with a cover".

This corrugated paper with a cover is placed, to make the spacer 20, as shown in FIG. 3a, with two sheets of corrugated paper with a cover joint together by sticking the covers 22 to form a spacer 20 having the wanted thickness and consistency, which presents corrugated surfaces both on its upper and lower side.

Figure 3C:
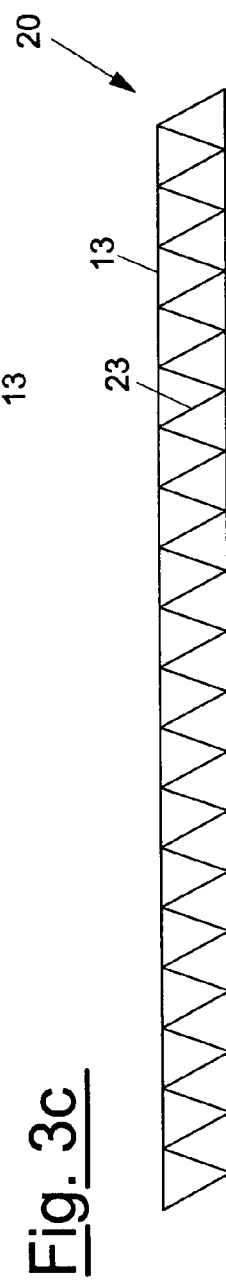

The spacer 20 can be advantageously produced as described above, or as shown in FIG. 3c, by using pleated paper 23.

The purpose of this spacer 20 is to prevent the collapse of the layers 13, as the spacer 20, by working under compression, sustains the above-mentioned layers 13 of filtering paper, maintaining them substantially at the same distance, thus guaranteeing an uniform filtration.

The essential condition for its functioning is, in fact, that the single layers 13 of the filtering element stay in their position, i.e. parallel and at the same distance.

In the absence of spacers 20, at the increase of the filter obstruction, therefore of the pressure drop that the gas suffers when it goes through, the layers 13, among which the filtered gas circulates, would tend to get closer and, when they come into contact, the filter would clog and would stop functioning.

This spacer 20, in whatever form is made, is placed with the generatrix of waves, or the folds, parallel to the gas flow defined by the arrows F1 in FIGS. 1a and 2.

This disposition of layers 13 and spacers 20 defines an alternate series of "dirty" cells 15 in which the gas to be filtered circulates, which is sent to the filtering paper through ducts 25 delimited by the waves 21 or folds 23 and by the filtering layers 13.

Said cells 15 of gas to be filtered, shown by the arrows F1, alternate, in the "Greek key" disposition of the filter, with "clean" cells 16, in which the filtered gas, shown by the arrows F2, circulates.

The gas is filtered when passes through these layers 13, according to the direction defined by arrows F'1, and, even if in a small portion, also through the front end of the filtering element 11, passing through the folds 14.

Gas enters into the cells 16 of the filtered gas and is sent to atmosphere through ducts 26, in turn delimited by waves 21 or pleatings 23 and by adjacent layers 13.

With particular reference to FIG. 1b, the side closing is shown, which is effected by folding the hedges 12 obtained thanks to the excess of the filtering microporous paper.

The spacer is kept, in fact, about 15 mm shorter, on both sides, of the layers 13, the filtering paper is moisten, by means of a glue, along said hedges 12, which are then folded upwards or downwards so as to obtain a shingle lap.

In this way, there is no communication between the cells through which the gas to be filtered flows, which have higher pressure, and those through which the filtered gas flows, at lower pressure.

Figure 5:
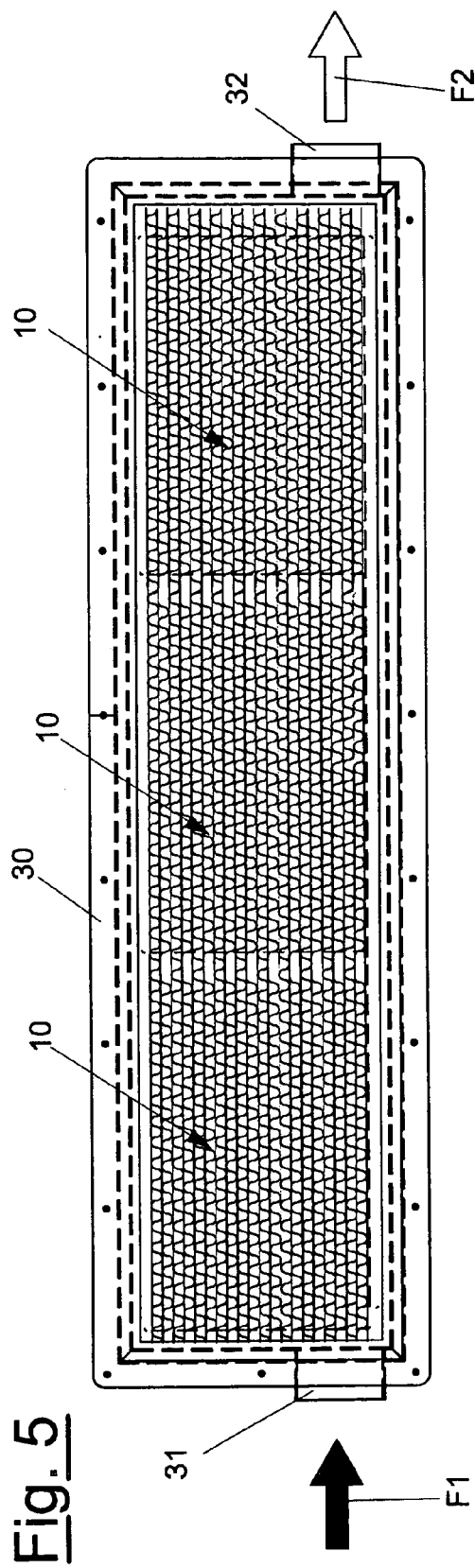
FIG. 5 is a schematic front view of the filter of FIG. 4 housed into a container.

Filter 10, as illustrated in FIG. 5, according to the preferred embodiment, is housed, singularly or in several replaceable elements, inside a container 30, easily mounted on a vehicle.

Said container 30 has an inlet duct, 31 oriented according to the direction F1, of the gas to be filtered, to be connected to the engine exhaust, and an outlet duct 32, oriented towards the direction F2, of the filtered gas to be released to the atmosphere.

Particular care must be taken for the condensate—which is formed at the start up, particularly during winter time—not to reach the filtrating paper; for this purpose, a suitable by-pass can be positioned upstream the inlet duct 31, selected, for example, by means of an intercepting valve, automatic or controlled by the driver, or by positioning, at the filter inlet, a suitable condensate separator easily found on the market.

The filter can also be equipped with a sensor which informs the driver that the filter must be shortly substituted.

The filter according to the invention realizes the wanted objects, in particular:

paper based filter, of very reduced dimensions but which can be used for quite long time before being substituted;

the filter causes extremely limited counter-pressures to the engine exhaust;

dimensions suitable to allow use both on commercial vehicles and cars;

substitution interval can be prolonged thanks to the possibility of excluding the filter under particular conditions, for example when the vehicle runs on extra-urban areas;

possibility of disposing of the used filter and its content of particulate without problems, for example by incineration, thanks to the use of materials mainly based on cellulose;

reduced costs, both of the replaceable filtering device and the container to be placed on the vehicle.

The invention claimed is:

1. A paper filter for filtering particulates emitted together with the exhaust gases of internal combustion engines, which comprises a filtering element (11) made in the form of a folded up sheet to form a "Greek key", having several filtering layers (13) placed substantially parallel, connected by means of folds (14), said filtering layers (13) being separated and maintained equidistant through the interposition of spacers (20) of such a rigidity as to prevent the collapse of the filtering layers (13) said spacers being arranged parallel to the direction of the inlet gas flow (F1) in the filtering element (11) wherein said spacers (20) comprise two corrugated boards, each one consisting, in turn, of a sheet of corrugated paper (21) stuck along a generatrix to a corresponding cover (22), said spacer (20) formed by two covers (22) which are stuck to one another to form said spacer (20) which therefore presents corrugated surfaces both on its upper and lower side, wherein the disposition of filtering layers (13) and spacers (20) defines an alternated series of "dirty" cells (15) in which the gas to be filtered circulates and is sent to the filtering layers (13) through ducts (25) delimited by the waves of the corrugated paper (21) and by the filtering layers (13), alternated in the "Greek key" disposition of the filter, with "clean" cells (16), in which the filtered gas (F2) circulates and is sent to the atmosphere through ducts (26), in turn delimited by the waves of the corrugated paper (21) and by adjacent filtering layers (13).

2. The filter according to claim 1, wherein said filtering element (11) presents, at the sides, foldable hedges (12) obtained thanks to the excess of the filtering microporous paper so as to obtain a shingle lap so that there is no communication between the cells, through which the gas to be filtered flows, which have a higher pressure, and those through which the filtered gas flows, which have a lower pressure.

3. The filter according to claim 1, wherein said filter (10) is adapted to be housed, singularly or in several elements, in a container (30) suitable for being affixed to on a vehicle.

* * * * *